(12) United States Patent
Park

(10) Patent No.: US 10,853,254 B2
(45) Date of Patent: Dec. 1, 2020

(54) MEMORY SYSTEM HAVING A MEMORY CONTROLLER AND A MEMORY DEVICE HAVING A PAGE BUFFER

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 44 days.

(21) Appl. No.: 16/107,226

(22) Filed: Aug. 21, 2018

(65) Prior Publication Data

US 2019/0227939 A1     Jul. 25, 2019

(30) Foreign Application Priority Data

Jan. 24, 2018   (KR) .......................... 10-2018-0008934

(51) Int. Cl.
*G06F 12/0866* (2016.01)
*G06F 13/16* (2006.01)
*G06F 12/02* (2006.01)
*G06F 13/42* (2006.01)

(52) U.S. Cl.
CPC ...... *G06F 12/0866* (2013.01); *G06F 13/1673* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 9,122,611 B2* | 9/2015 | Yeh ..................... | G06F 12/0862 |
| 9,990,280 B2* | 6/2018 | Shen .................... | G06F 12/0246 |
| 2003/0018849 A1* | 1/2003 | Takaichi ............... | G06F 3/0601 711/113 |
| 2004/0205301 A1* | 10/2004 | Hara .................... | G06F 12/0862 711/137 |
| 2005/0223175 A1* | 10/2005 | Hepner ............... | G06F 12/0862 711/137 |
| 2008/0294855 A1* | 11/2008 | Chen ................... | G06F 12/0215 711/154 |

FOREIGN PATENT DOCUMENTS

KR     1020080030213     4/2008

* cited by examiner

*Primary Examiner* — Michael Alsip
(74) *Attorney, Agent, or Firm* — IP & T Group LLP

(57) ABSTRACT

There are provided a memory controller and a memory system having the same. A memory controller includes: a command queue for queuing commands and outputting command information including Information of a previous command and a subsequent command; a command detector for outputting a detection signal according to the command information; and a command generator for generating the command and outputting a management command for managing a last command immediately following the previous command in response to the detection signal.

14 Claims, 10 Drawing Sheets

MEMORY SYSTEM HAVING A MEMORY CONTROLLER AND A MEMORY DEVICE HAVING A PAGE BUFFER

CROSS-REFERENCE TO RELATED APPLICATION

The present application claims priority under 35 U.S.C. § 119(a) to Korean patent application number 10-2018-0008934, filed on Jan. 24, 2018, which is incorporated herein by reference in its entirety.

BACKGROUND

1. Field of Invention

Various embodiments of the present disclosure relate to a memory controller and a memory system including the memory controller. Particularly, the embodiments relate to a memory controller capable of performing a cache read operation and a memory system including the memory controller.

2. Description of the Related Art

A memory system may include a memory device and a memory controller.

The memory device may store data and output the stored data. The memory device may be configured as a volatile memory device in which stored data is lost when the power supply is interrupted, or be configured as a nonvolatile memory device in which stored data is retained even when the power supply is interrupted.

The memory controller may control data communication between a host and the memory device.

The host may communicate with the memory device through the memory controller by using an interface protocol such as Peripheral Component Interconnect-express (PCI-E), Advanced Technology Attachment (ATA), Serial ATA (SATA), Parallel ATA (PATA), or Serial Attached SCSI (SAS). Other interface protocols between the host and the memory system that may be used include a Universal Serial Bus (USB), a Multi-Media Card (MMC), an Enhanced Small Disk Interface (ESDI), and Integrated Drive Electronics (IDE).

SUMMARY

Embodiments provide a memory controller capable of managing the last data cached during a cache read operation according to a next command, and a memory system having the memory controller.

According to an aspect of the present disclosure, there is provided a memory controller including: a command queue configured to queue commands and output command information including information of a previous command and a subsequent command; a command detector configured to output a detection signal according to the command information; and a command generator configured to generate the command and output a management command for managing a last command immediately following the previous command in response to the detection signal.

According to an aspect of the present disclosure, there is provided a memory system including: a memory device including memory cells for storing data, the memory device including a plurality of page buffers for temporarily storing data read from the memory cells; and a memory controller coupled to the memory device through a channel, the memory controller controlling the memory device such that the plurality of page buffers are controlled according to a previous operation performed in the memory device and a subsequent operation to be performed in the memory device.

According to an aspect of the present disclosure, there is provided a memory system including: a memory device configured to store data; and a memory controller configured to control the memory device to simultaneously perform a data sensing operation and an output operation, in response to a cache read command, wherein the memory controller includes: a command queue configured to queue the cache read command and output command information including information of a subsequent command of the cache read command; a command detector configured to output a detection signal according to the command information; and a command generator configured to generate the commands and output a management command for managing last data of a previous command in response to the detection signal.

According to an aspect of the present disclosure, there is provided a memory system including: a memory device including a memory cell array and latches; a command queue configured to queue a plurality of commands to be serviced, the queued commands including a cache read command; and a controller configured to: control the memory device to perform operations in response to the queued commands by sequentially latching in the latches data sensed from the memory cell array; and selectively reset, after completion of an operation in response to the cache read command, at least some of the latches according to similarity between the cache read command and a command immediately subsequent to the cache read command, among the queued commands.

BRIEF DESCRIPTION OF THE DRAWINGS

Various embodiments will now be described more fully with reference to the accompanying drawings; however, elements and features of the present disclosure may be configured or arranged differently than shown or described herein. Thus, the present invention is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, embodiments of the present disclosure are shown and described simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more other components rather than excluding such other component(s), unless the context indicates otherwise. Also, throughout the specification, reference to "an embodiment" or the like is not necessarily to only one embodiment, and different references to "an embodiment" or the like are not necessarily to the same embodiment(s).

The terminology used herein is for the purpose of describing particular embodiments only and is not intended to be limiting of the present invention.

As used herein, singular forms may include the plural forms as well and vice versa, unless the context clearly indicates otherwise.

Figure 1:
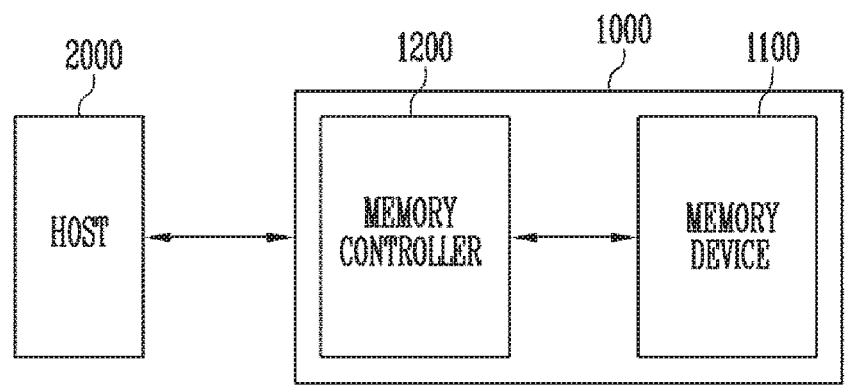
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples; any of various other interface protocols such as a Universal Serial Bus (USB), a Multi-Media Card (MMC), an Enhanced Small Disk Interface (ESDI), and Integrated Drive Electronics (IDE) may be used instead.

The memory controller 1200 may control overall operations of the memory system 1000, and control data exchange between the host 2000 and the memory device 1100. For example, the memory controller 1200 may modify received information such that commands, addresses, and data can be communicated between the host 2000 and the memory device 1100, and store and output the modified information. For example, the memory controller 1200 may control the memory device 1100 to perform a program, read or erase operation.

The memory controller 1200 according to an embodiment may control the memory device 1100 to perform a cache read operation by generating a cache read command. The memory device 1100 may cache read data in latches in response to the cache read command, and simultaneously output previously cached read data when next data is read. In the cache read operation, the memory controller 1200 may manage read data last cached in the cache read operation according to an operation after the cache read operation.

The memory device 1100 may be configured to store data. For example, the memory device 1100 may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and a flash memory.

Figure 2:
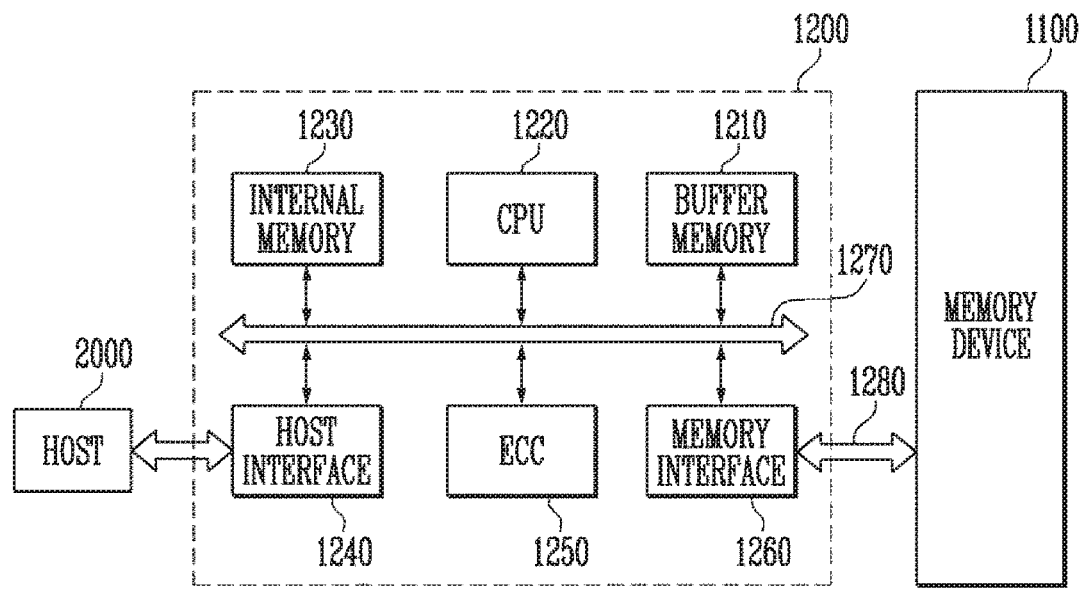
FIG. 2 is a diagram illustrating in detail a memory controller of FIG. 1.

FIG. 2 is a diagram illustrating in detail the memory controller of FIG. 1.

Referring to FIG. 2, the memory controller 1200 may include a buffer memory 1210, a central processing unit (CPU) 1220, an internal memory 1230, a host interface 1240, an error correction circuit (ECC) 1250, and a memory interface 1260 so as to control communication between the host 2000 and the memory device 1100. The buffer memory 1210, the CPU 1220, the internal memory 1230, the host interface 1240, the ECC 1250, and the memory interface 1260 may communicate with each other through a bus 1270, and the memory interface 1260 may communicate with the memory device 1100 through a channel 1280.

The buffer memory 1210 may temporarily store data communicated between the memory controller 1200 and the memory device 1100. For example, in a program operation, data to be programmed may be temporarily stored in the buffer memory 1210 before the data is transmitted to the memory device 1100. The stored data may be re-used when the program operation fails in the memory device 1100. Also, in a read operation, data read from the memory device 1100 may be temporarily stored in the buffer memory 1210. For example, read data of a fixed quantity may be stored temporarily in the buffer memory 1210 in the read operation, and the read data may be output to the host 2000 through the host interface 1240.

The CPU 1220 may perform various calculations for controlling the memory device 1100 or execute firmware. Also, the CPU 1220 may generate normal commands in response to normal requests received from the host 2000, or generate a suspend command in response to a suspend request received from the host 2000. The CPU 1220 according to this embodiment may generate a command and transmit the command to the memory interface 1260 through the bus 1270. Also, the CPU 1220 may selectively output various management commands according to information of a subsequent command. Here, the management commands may be commands for managing the last data of a currently executed command.

The internal memory 1230 may be used as a storage device capable of storing various system information required to perform an operation of the memory controller 1200. For example, the internal memory 1230 may be implemented with an SRAM. The internal memory 1230 may include a table in which various system information required to perform an operation of the memory system 1000 are stored.

The host interface 1240 may be configured to communicate with the external host 2000 coupled to the memory system 1000 under the control of the CPU 1220. For example, the host interface 1240 may receive a write command, data, and a logical address corresponding to the write command from the host 2000. Also, the host interface 1240 may receive a read command and a logical address corresponding to the read command from the host 2000.

The ECC 1250 may detect or correct an error included in data read from the memory device 1100. For example, the ECC 1250 may perform an error correction code (ECC) encoding operation based on data to be written in the memory device 1100 through the memory interface 1260. The data on which the ECC encoding operation is performed may be transferred to the memory device 1100 through the memory interface 1260. Also, the ECC 1250 may perform ECC decoding on data received from the memory device 1100 through the memory interface 1260. The ECC 1250 may perform an ECC operation, based on Bose, Chaudhuri, and Hocquenghem (BCH) code or Low Density Parity Check (LDPC) code.

The memory interface 1260 may be configured to communicate with the memory device 1100 under the control of the CPU 1220. The memory interface 1260 according to an embodiment may manage a queue of commands received from the CPU 1220, and transmit a command to the memory device 1100. Also, the memory interface 1260 may transmit an address and data to the memory device 1100 in addition to the command, or receive data read from the memory device 1100.

Figure 3:
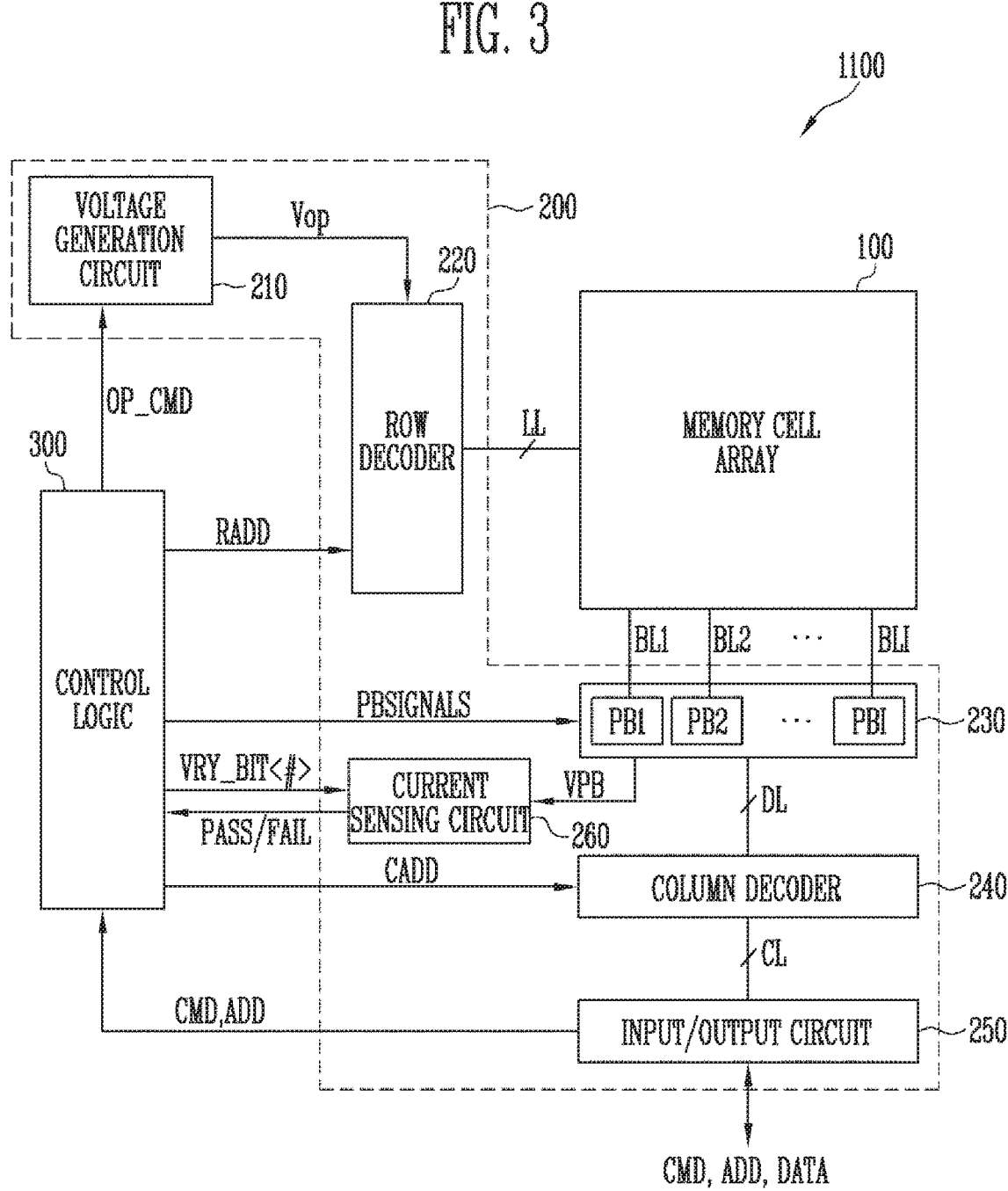
FIG. 3 is a diagram illustrating in detail a memory device of FIG. 1.

FIG. 3 is a diagram illustrating in detail the memory device of FIG. 1.

Referring to FIG. 3, the memory device 1110 may include a memory cell array 100 that stores data. The memory device 1110 may include peripheral circuits 200 configured to perform a program operation for storing data in the memory cell array 100, a read operation for outputting the stored data, and an erase operation for erasing the stored data. The memory device 1110 may include control logic 300 that controls the peripheral circuits 200 under the control of the memory controller 1200 (of FIG. 1).

The memory cell array 100 may include a plurality of memory blocks. User data and various information necessary for an operation of the memory device 1100 may be stored in the memory blocks. The memory blocks may be implemented in a two-dimensional or three-dimensional structure. Recently, memory blocks have been mainly implemented in the three-dimensional structure. For example, memory blocks having the two-dimensional structure may include memory cells arranged in parallel to a substrate, and memory blocks having the three-dimensional structure may include memory cells stacked vertically to a substrate.

The peripheral circuits 200 may be configured to perform program, read, and erase operations under the control of the control logic 300. For example, the peripheral circuits 200 may include a voltage generation circuit 210, a row decoder 220, a page buffer group 230, a column decoder 240, an input/output circuit 250, and a current sensing circuit 260.

The voltage generation circuit 210 may generate various operating voltages Vop used for program, read, and erase operations in response to an operation signal OP_CMD. For example, the voltage generation circuit 210 may generate a program voltage, a verify voltage, a pass voltage, a compensation program voltage, a read voltage, an erase voltage, a turn-on voltage, and the like under the control of the control logic 300.

The row decoder 220 may transfer the operating voltages Vop to local lines LL coupled to a selected memory block among the memory blocks of the memory cell array 100 in response to a row address RADD. The local lines LL may include local word lines, local drain select lines, and local source select lines. In addition, the local lines LL may include various lines such as a source line, which are coupled to the memory block.

The page buffer group 230 may be coupled to bit lines BL1 to BLI coupled to the memory blocks of the memory cell array 100. The page buffer group 230 may include a plurality of page buffers PB1 to PBI coupled to the bit lines BL1 to BLI. The page buffers PB1 to PBI may operate in response to page buffer control signals PBSIGNALS. For example, the page buffers PB1 to PBI may temporarily store data received through the bit lines BL1 to BLI, or sense voltages or currents of the bit lines BL1 to BLI in a read or verify operation. Each of the page buffers PB1 to PBI may include a plurality of latches capable of temporarily storing data. For example, each of the page buffers PB1 to PBI may include at least three latches so as to cache read data in a cache read operation.

The column decoder 240 may transfer data between the input/output circuit 250 and the page buffer group 230 in response to a column address CADD. For example, the column decoder 240 may exchange data with the page buffers PB1 to PBI through data lines DL, or exchange data with the input/output circuit 250 through column lines CL.

The input/output circuit 250 may transfer a command CMD and an address ADD, which are received from the memory controller 1200 (of FIG. 2), to the control logic 300, or communicate data DATA with the column decoder 240. For example, if a debugging command, an address, and debugging information are received from the memory controller 1200, the input/output circuit 250 may transmit the debugging command and the address to the control logic 300, and transmit the debugging Information to the column decoder 240.

In a read operation or a verify operation, the current sensing circuit 260 may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the page buffer control signals PBSIGNALS, and the permission bit VRY_BIT<#> in response to the command CMD and the address ADD. Also, the control logic 300 may determine whether the verify operation has passed or failed in response to the pass or fail signal PASS or FAIL.

In particular, the control logic 300 may control the peripheral circuits 200 in response to a command received from the memory controller 1200 (of FIG. 2). For example, the control logic 300 may control the page buffers PB1 to PBI to cache read data through a cache read operation in response to a cache read command. Also, after the cache read operation is completed, the control logic 300 may control the latches of the page buffers PB1 to PBI in response to a management command transmitted from the memory controller 1200 according to a subsequent command from the host. For example, the control logic 300 may transmit data cached in the latches of the page buffers PB1 to PBI to other latches or reset the latches, in response to the manage commands.

Figure 4:
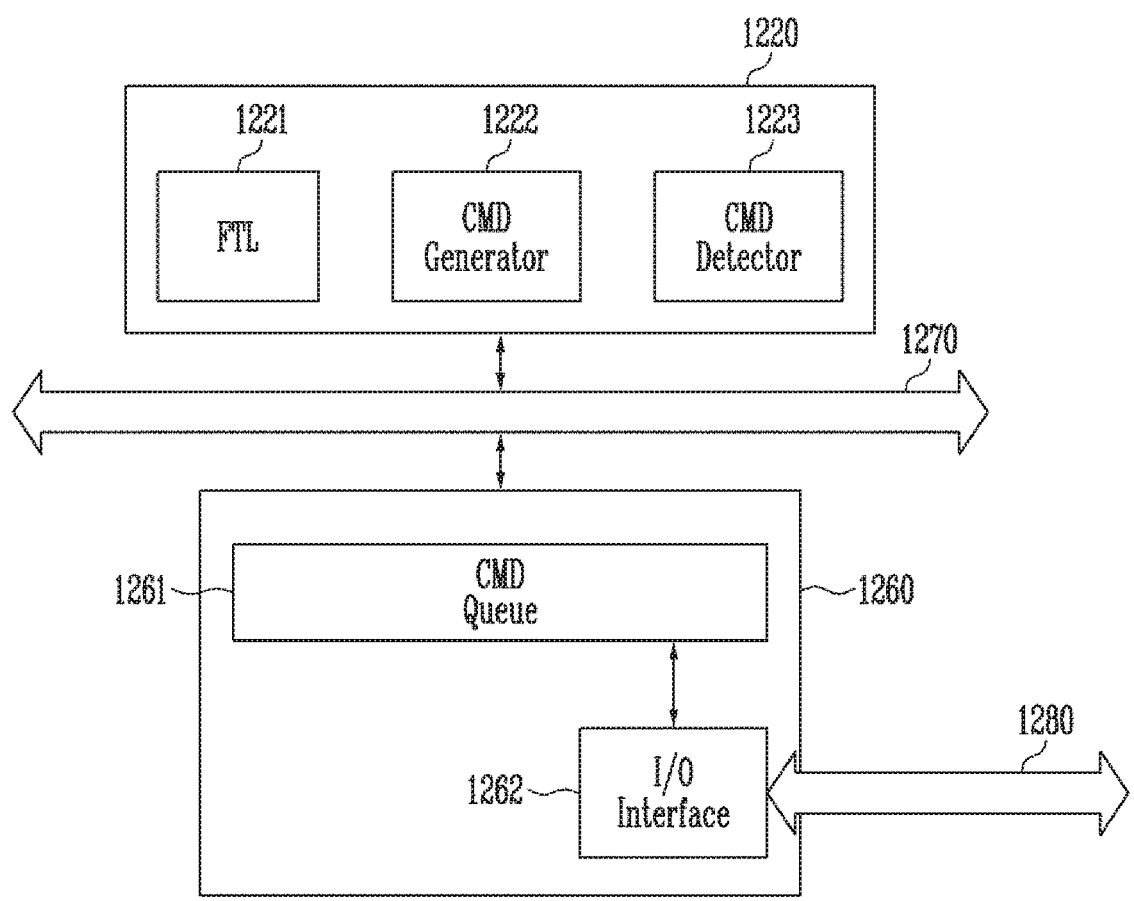
FIG. 4 is a diagram illustrating in detail a central processing unit and a memory interface according to an embodiment of the present disclosure.

FIG. 4 is a diagram illustrating in detail a CPU and a memory interface according to an embodiment of the present disclosure.

Referring to FIG. 4, the CPU 1220 and the memory interface 1260 may communicate with each other through a bus 1270.

The CPU 1220 may include a flash translation layer (FTL) 1221, a command (CMD) generator 1222, and a CMD detector 1223.

The FTL 1221 may be configured to allow the host (2000 of FIG. 2) to access the memory device 1100 (of FIG. 2).

The CMD generator 1222 may generate commands for a request from the host 2000 or an internal operation of the memory controller 1200 (of FIG. 2). For example, the CMD generator 1222 may generate cache read commands, management commands, program commands, erase commands, and the like. The cache read commands are commands for a cache read operation, and the management commands are commands for managing the last data of the cache read operation according to an operation to be performed after the cache read operation. The program commands are commands for performing a program operation, and the erase commands are commands for performing an erase operation.

The CMD detector 1223 may generate a detection signal according to command information received from the memory interface 1260, and transmit the detection signal to the CMD generator 1222. The CMD generator 1222 may output a selected command among the management commands in response to the detection signal.

The memory interface 1260 may include a CMD queue 1261 and an input/output (I/O) interface 1262.

The CMD queue 1261 may queue and store commands output from the CMD generator 1222, and sequentially output the queued commands.

Furthermore, the CMD queue 1261 generates command information CMD_IF in response to queued commands.

The I/O interface 1262 may be coupled to the memory device 1100 through a channel 1280, and transmit a command, an address, and data between the memory controller 1200 and the memory device 1100.

Figure 5:
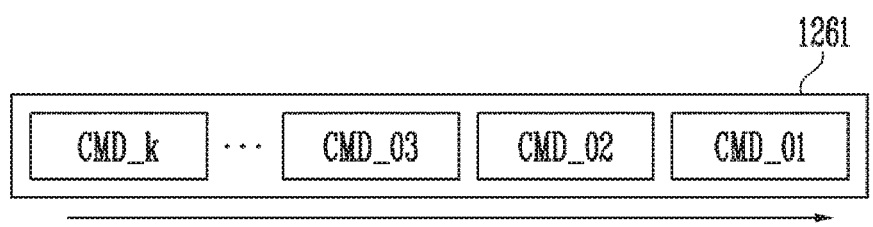
FIG. 5 is a diagram illustrating a command queue.

FIG. 5 is a diagram illustrating the CMD queue.

Referring to FIG. 5, the CMD queue 1261 may temporarily store commands CMD_01 to CMD_k (k is a positive integer) output from the CMD generator 1222, and output the commands CMD_01 to CMD_k according to the stored order of the commands CMD_01 to CMD_k.

Figure 6:
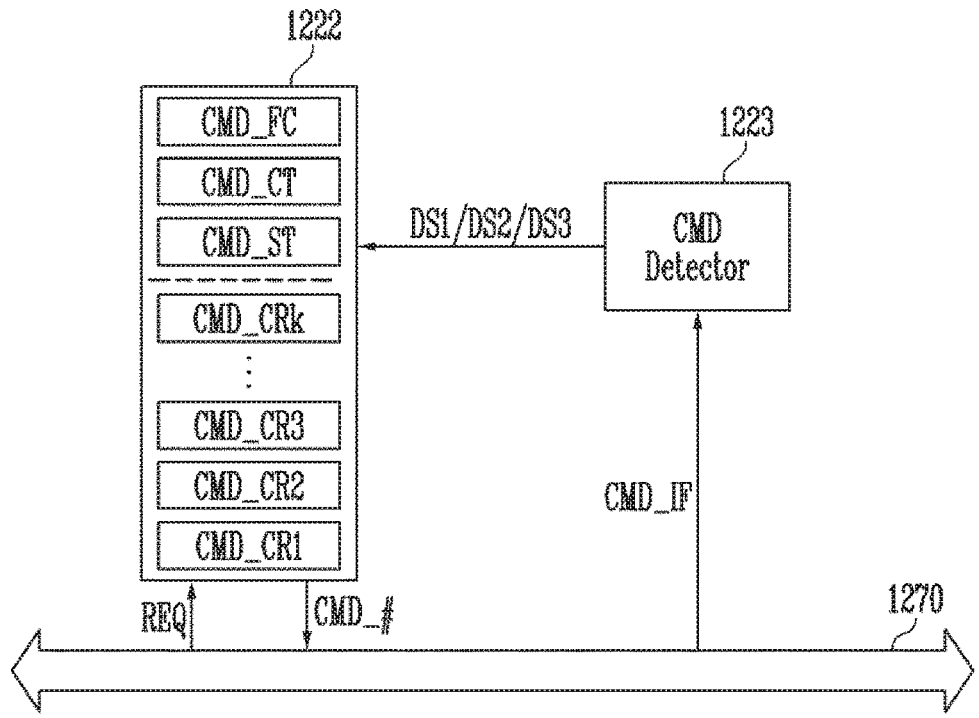
FIG. 6 is a diagram illustrating in detail an operation of a command generator and a command detector of FIG. 4.

FIG. 6 is a diagram illustrating in detail an operation of the CMD generator and the CMD detector of FIG. 4.

Referring to FIG. 6, the CMD generator 1222 may generate and output various commands. For example, the CMD generator 1222 may output various commands CMD_# in response to a request REQ received from the host 2000 (of FIG. 2). For example, the CMD generator 1222 may generate and output various cache read commands CMD_CR1 to CMD_CRk (k is a positive integer) and first to third management commands CMD_ST, CMD_CT, and CMD_FC.

The CMD detector 1223 may compare a currently executed command and a command queued and to be executed next according to command information CMD_IF received through the bus 1270, and selectively output first to third detection signals DS1 to DS3 based on the compared result. The command information CMD_IF may be information such as an address etc. included in commands. For example, if it is determined that a command different from the currently executed command is queued according to the command information CMD_IF, the CMD detector 1223 may output the first detection signal DS1. If it is determined that a command sequential to the currently executed command is queued according to the command information CMD_IF, the CMD detector 1223 may output the second detection signal DS2. If it is determined that a command is the same or similar to the currently executed command is queued but its address is not sequential to the address of the currently executed command according to the command information CMD_IF, the CMD detector 1223 may output the third detection signal DS3.

The CMD generator 1222 may output the first management command CMD_ST in response to the first detection signal DS1, output the second management command CMD_CT in response to the second detection signal DS2, and output the third management command CMD_FC in response to the third detection signal DS3. The first to third management commands CMD_ST, CMD_CT, and CMD_FC will be described later with reference to FIGS. 7 to 9.

Figure 7:
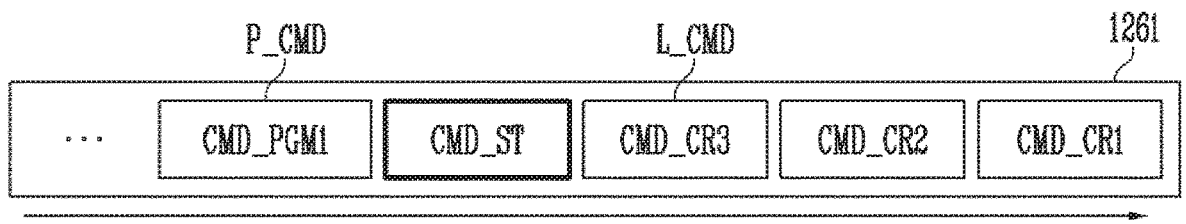
FIGS. 7 to 9 are diagrams illustrating a command queue according to an embodiment of the present disclosure.
Figure 8:
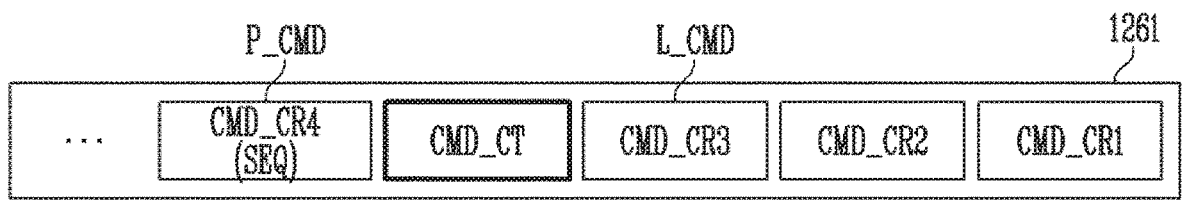
Figure 9:
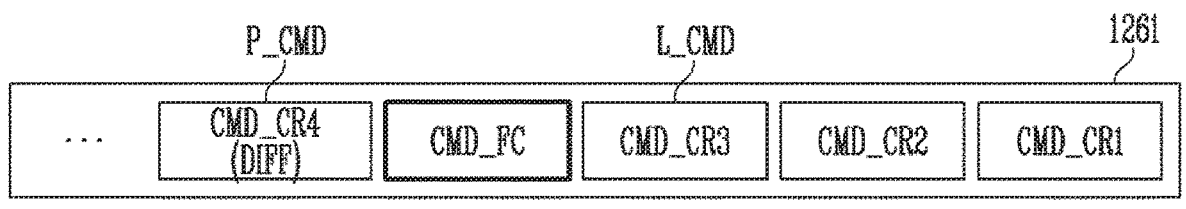

FIGS. 7 to 9 are diagrams illustrating a CMD queue according to an embodiment of the present disclosure. FIG. 7 is a diagram illustrating a case where the first management command (CMD_ST of FIG. 6) is output, FIG. 8 is a diagram illustrating a case where the second management command (CMD_CT of FIG. 6) is output, and FIG. 9 is a diagram illustrating a case where the third management command (CMD_FC of FIG. 6) is output. FIG. 6 will be described together with FIGS. 7 to 9.

Referring to FIGS. 7 and 6, a cache read operation may be performed in the memory device 1100 as first to third cache read commands CMD_CR1 to CMD_CR3 are output according to the CMD queue 1261. When the third cache read command CMD_CR3 is the last command L_CMD among the cache read commands, and a subsequent command P_CMD is a program command CMD_PGM1, the subsequent command P_CMD is a command (i.e., a command for another operation) different from the last command L_CMD. Therefore, the first management command CMD_ST may be output next to the third cache read command CMD_CR3 that is the last command L_CMD.

That is, command information CMD_IF may be transmitted to the CMD detector 1223 according to the last command L_CMD and the subsequent command P_CMD of the CMD queue 1261. The CMD detector 1223 may output the first detection signal DS1 according to the command information CMD_IF, and the CMD generator 1222 may output the first management command CMD_ST in response to the first detection signal DS1. The first management command CMD_ST output from the CMD generator 1222 may be queued next to the last command L_CMD of the CMD queue 1261.

The memory device 1100 may be controlled to rapidly execute the program command CMD_PGM1 that is the subsequent command P_CMD according to the first management command CMD_ST. A method for controlling the memory device 1100 according to the first management command CMD_ST will be described in detail with reference to FIG. 17.

Referring to FIGS. 8 and 6, a cache read operation may be performed in the memory device 1100 as the first to third cache read commands CMD_CR1 to CMD_CR3 are output according to the CMD queue 1261. When a subsequent command P_CMD to be executed after the last command L_CMD is a command SEQ sequential to the last command L_CMD, the second management command CMD_CT may be output next to the third cache read command CMD_CR3 that is the last command L_CMD. For example, a fourth cache read command CMD_CR4 having an sequential address is queued as the subsequent command P_CMD, the second management command CMD_CT may be queued next to the third cache read command CMD_CR3.

The memory device 1100 may be controlled to rapidly perform the subsequent command P_CMD according to the second management command CMD_CT. A method for controlling the memory device 1100 according to the second management command CMD_CT will be described in detail with reference to FIG. 18.

Referring to FIGS. 9 and 6, a cache read operation may be performed in the memory device 1100 as the first to third cache read commands CMD_CR1 to CMD_CR3 are output according to the CMD queue 1261. When a subsequent command P_CMD to be executed after the last command L_CMD is a command DIFF having an address that is not sequential to that of the last command L_CMD, the third management command CMD_FC may be output next to the third cache read command CMD_CR3 that is the last command L_CMD. For example, when a fourth cache read command CMD_CR4 having an address different from that of a logical unit LUN is queued as the subsequent command P_CMD, the third management command CMD_FC may be queued next to the third cache read command CMD_CR3.

The memory device 1100 may be controlled to rapidly perform the subsequent command P_CMD according to the third management command CMD_FC. A method for controlling the memory device 1100 according to the third management command CMD_FC will be described in detail with reference to FIG. 19.

FIGS. 10 to 16 are diagrams illustrating a cache read operation according to an embodiment of the present disclosure.

Figure 10:
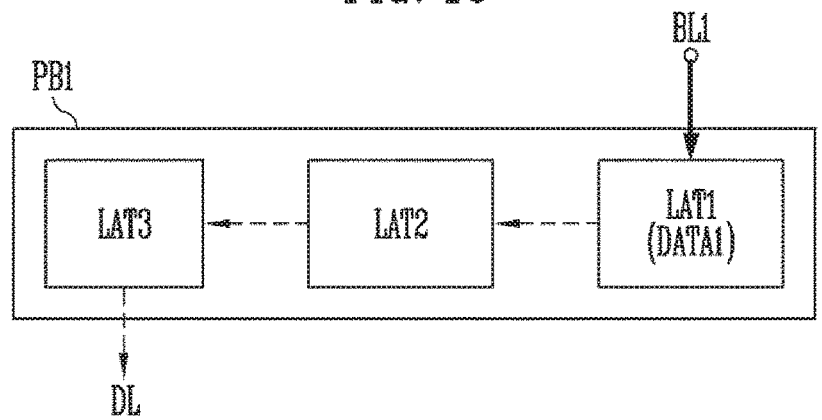
FIGS. 10 to 16 are diagrams illustrating a cache read operation according to an embodiment of the present disclosure.

Referring to FIG. 10, in the cache read operation, data of selected memory cells may be read based on a current or voltage of bit lines coupled to the selected memory cells, and data of other, non-selected memory cells may be simultaneously read when the read data of the selected memory cells is output. To this end, each of the page buffers may include a plurality of latches. A first page buffer PB1 coupled to a first bit line BL1 will be described as an example.

The first page buffer PB1 may include first to third latches LAT1 to LAT3. The first latch LAT1 may be coupled to the first bit line BL1, the third latch LAT3 may be coupled to a data line DL, and the second latch LAT2 may be coupled between the first and third latches LAT1 and LAT3.

In the cache read operation, first data DATA1 of a first memory cell may be read through the first bit line BL1 to be temporarily stored in the first latch LAT1. For example, the first data DATA1 sensed from the first memory cell may be stored in the first latch LAT1.

Figure 11:
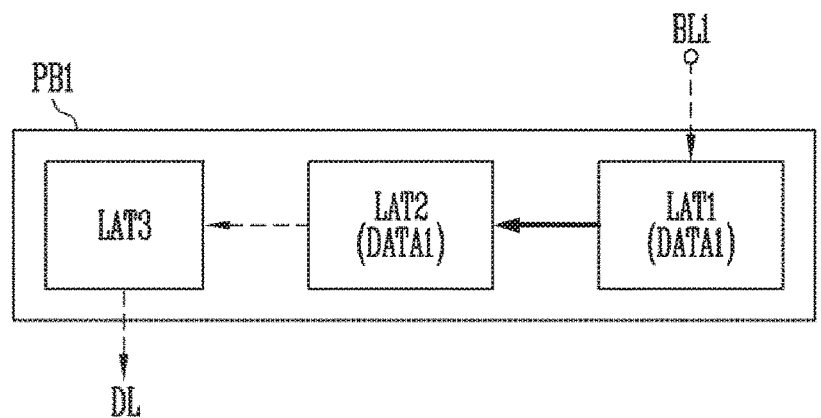

Referring to FIG. 11, the first data DATA1 temporarily stored in the first latch LAT1 may be transmitted to the second latch LAT2.

Figure 12:
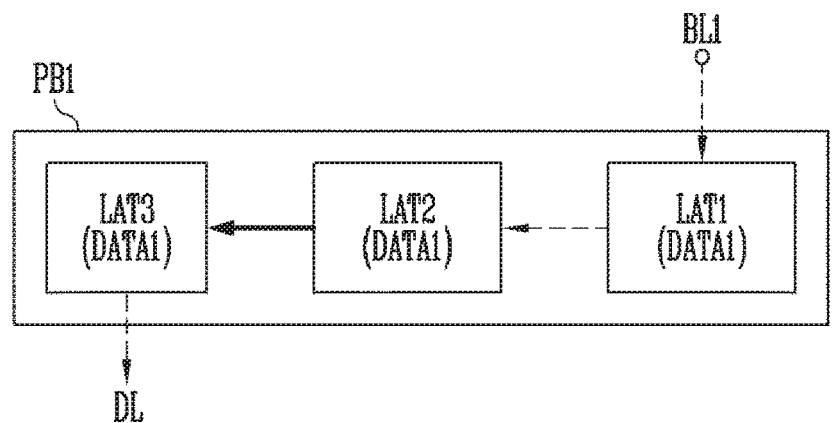

Referring to FIG. 12, the first data DATA1 stored in the second latch LAT2 may be transmitted to the third latch LAT3 to be output.

Figure 13:
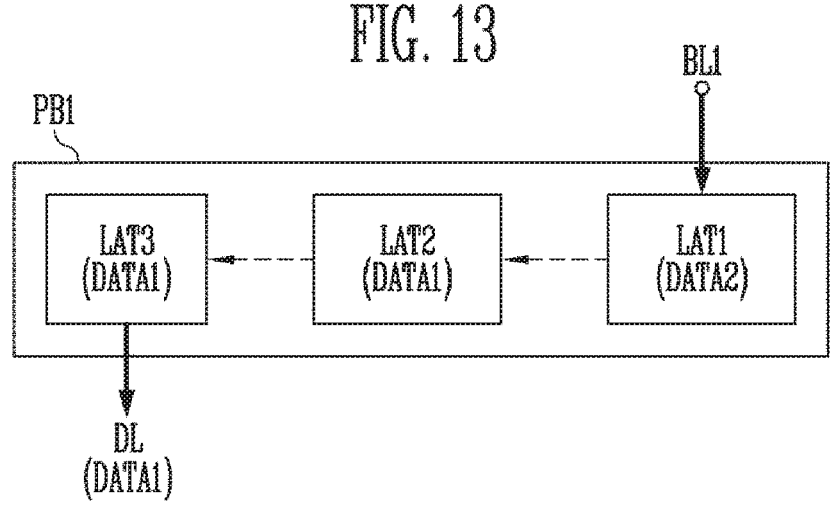

Referring to FIG. 13, the first data DATA1 stored in the third latch LAT3 may be output through the data line DL. Second data DATA2 of a second memory cell may be read to be temporarily stored in the first latch LAT1 through the first bit line BL1. For example, a read operation of the second memory cell may be performed while the first data DATA1 is being transmitted from the first latch LAT1 to the third latch LAT3 in FIGS. 11 and 12. At the same time when the second data DATA2 sensed from the second memory cell is stored in the first latch LAT1, the first data DATA1 stored in the third latch LAT3 is output, and thus the time required to perform the read operation can be reduced.

Figure 14:
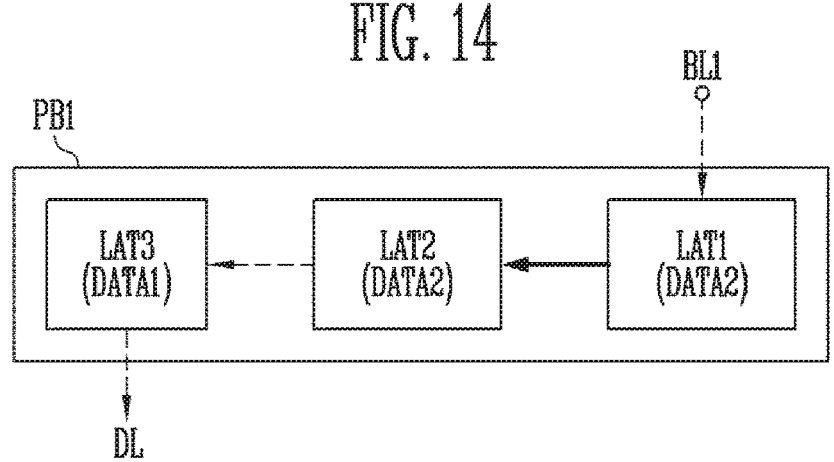

Referring to FIG. 14, the second data DATA2 temporarily stored in the first latch LAT1 may be transmitted to the second latch LAT2 to perform a next operation.

Figure 15:
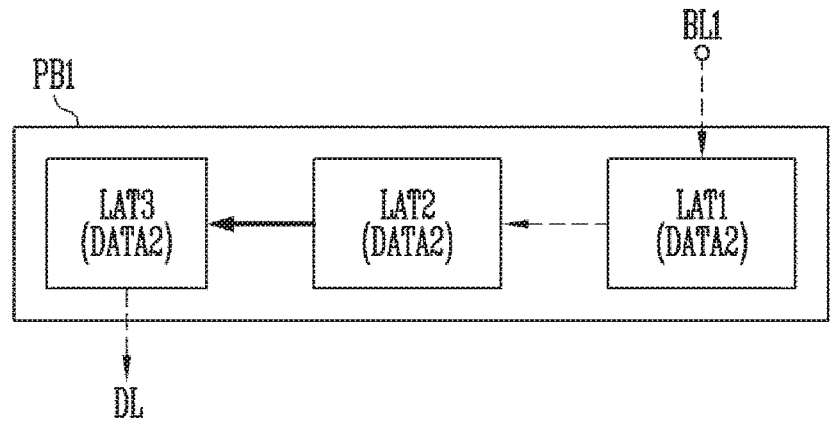

Referring to FIG. 15, the second data DATA2 stored in the second latch LAT2 may be transmitted to the third latch LAT3 to be output.

Figure 16:
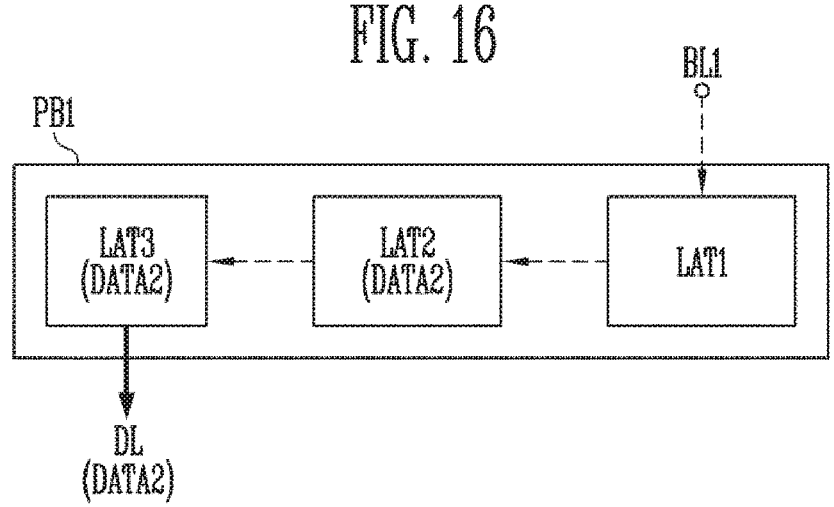

Referring to FIG. 16, the second data DATA2 stored in the third latch LAT3 may be output through the data line DL. If the second data DATA2 is the last data output, no next data is sensed in the first latch LAT1.

As described above, when the last data is output during the cache read operation, the memory device 1100 may reset latches in each of the page buffers in different ways in response to the first to third management commands CMD_ST, CMD_CT, and CMD_FC received from the memory controller 1200. A method for resetting latches in response to each management command will be described with reference to FIGS. 17 to 19.

Figure 17:
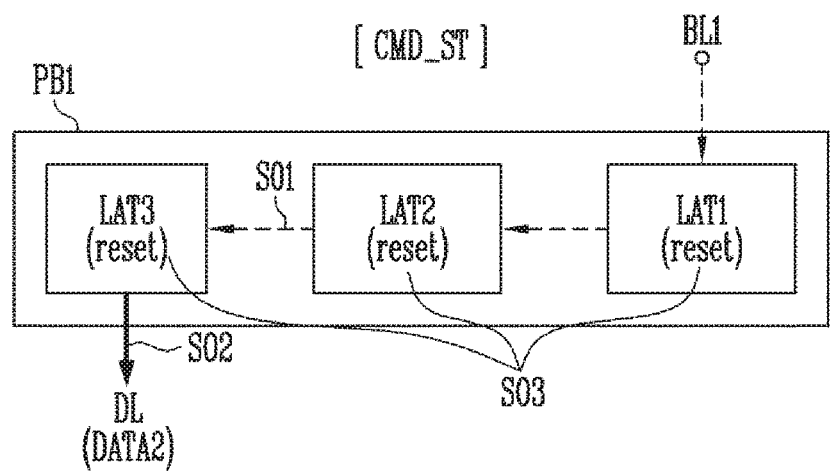
FIG. 17 is a diagram illustrating a method for managing the last data in response to a first management command according to an embodiment of the present disclosure.

FIG. 17 is a diagram illustrating a method for managing the last data in response to the first management command CMD_ST in accordance with an embodiment of the present disclosure.

Referring to FIG. 17, since the first management command CMD_ST is output when a subsequent command P_CMD is for an operation different from that of the last command L_CMD, the memory device 1100 may reset all of the first to third latches LAT1 to LAT3 in the first page buffer PB1 in response to the first management command CMD_ST, and may perform a next operation in response to the subsequent command P_CMD.

For example, in a cache read operation, when the second data DATA2 is the last data, the second data DATA2 stored in the second latch LAT2 is transmitted to the third latch LAT3 (S01), and any next data is not sensed in the first latch LAT1 when the second data DATA2 stored in the third latch LAT3 is output through the data line DL (S02).

Subsequently, in order to perform the next operation in response to the subsequent command P_CMD, the first to third latches LAT1 to LAT3 may all be reset in response to the first management command CMD_ST (S03). Alternatively, the first to third latches LAT1 to LAT3 may all be initialized in response to the first management command CMD_ST.

When the subsequent command P_CMD is a program command, program data is to be input to the third latch LAT3 through the data line DL, and is to be transmitted to the first latch LAT1 via the second latch LAT2. Thus, if the first to third latches LAT1 to LAT3 are all reset, a subsequent operation can be rapidly performed. That is, if the latches of the page buffers are all reset at the same time when the data cached last in the cache read operation is output, the time required to reset the latches of the page buffers in a subsequent program operation can be reduced. Accordingly, the operating time of the memory system 1000 can be reduced.

The first to third latches LAT1 to LAT3 of the first page buffer PB1 may be controlled according to the buffer control signals PBSIGNALS output from the control logic 300 (of FIG. 3).

Figure 18:
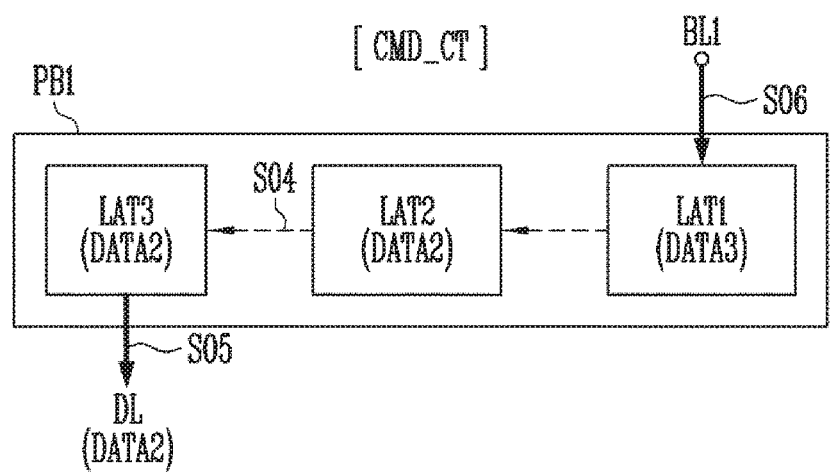
FIG. 18 is a diagram illustrating a method for managing the last data in response to a second management command according to an embodiment of the present disclosure.

FIG. 18 is a diagram illustrating a method for managing the last data in response to the second management command CMD_CT in accordance with an embodiment of the present disclosure.

Referring to FIG. 18, since the second management command CMD_CT is output when a subsequent command P_CMD is a command sequential to the last command L_CMD, the memory device 1100 may not perform any action on the first to third latches LAT1 to LAT3 in response to the second management command CMD_CT, and may sequentially perform a next operation in response to the subsequent command P_CMD.

For example, in a cache read operation, when the second data DATA2 is the last data, the second data DATA2 stored in the second latch LAT2 is transmitted to the third latch LAT3 (S04). When the second data DATA2 stored in the third latch LAT3 is output through the data line DL (S05), the memory device 1100 may not perform any action on the first to third latches LAT1 to LAT3 in response to the second management command CMD_CT. Then, the third data DATA3 may be stored in the first latch LAT1 through the cache read operation performed in response to the subsequent command P_CMD, which is also a cache read command (S06). That is, when the second data DATA2 is output (S05), the third data DATA3 sensed from a third memory cell may be temporarily stored in the first latch LAT1.

That is, although a previous cache read operation has ended, when a subsequent operation is a sequential cache read operation, the subsequent operation is performed without resetting the latches of the page buffers. Thus, the operating time of the memory system 1000 can be reduced.

Figure 19:
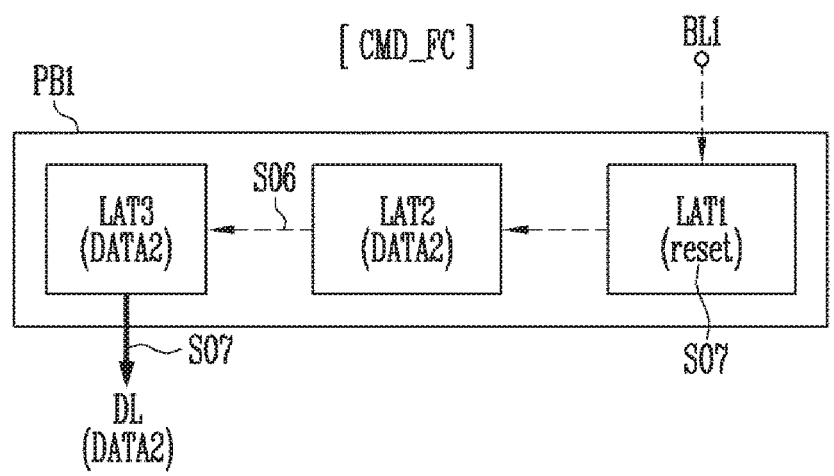
FIG. 19 is a diagram illustrating a method for managing the last data in response to a third management command according to an embodiment of the present disclosure.

FIG. 19 is a diagram illustrating a method for managing the last data in response to the third management command CMD_FC in accordance with an embodiment of the present disclosure.

Referring to FIG. 19, since the third management command CMD_FC is output when a subsequent command P_CMD is similar to the last command L_CMD but its address is not sequential to that of the last command L_CMD, the memory device 1100 may reset the first latch LAT1 in response to the third management command CMD_FC, and may perform a next operation in response to the subsequent command P_CMD.

For example, in a cache read operation, when the second data DATA2 is the last data, the second data DATA2 stored in the second latch LAT2 is transmitted to the third latch LAT3 (S06). When the second data DATA2 stored in the third latch LAT3 is output through the data line DL (S07), the first latch LAT1 may be reset in response to the third management command CMD_FC (S07).

That is, although the same cache read operation as a previous cache read operation is performed, if the address of a logical unit LUN is different from that in the previous cache read operation, a read operation of another plane or memory block is mapped to the corresponding logical unit LUN, and therefore, only the first latch LAT1 coupled to the first bit line BL1 may be reset. A reset operation of the first latch LAT1 and an output operation of the second data DATA2 that is the last data of the previous cache read operation are simultaneously performed, so that the operating time of the memory system 1000 in the performance of a subsequent operation can be reduced.

Figure 20:
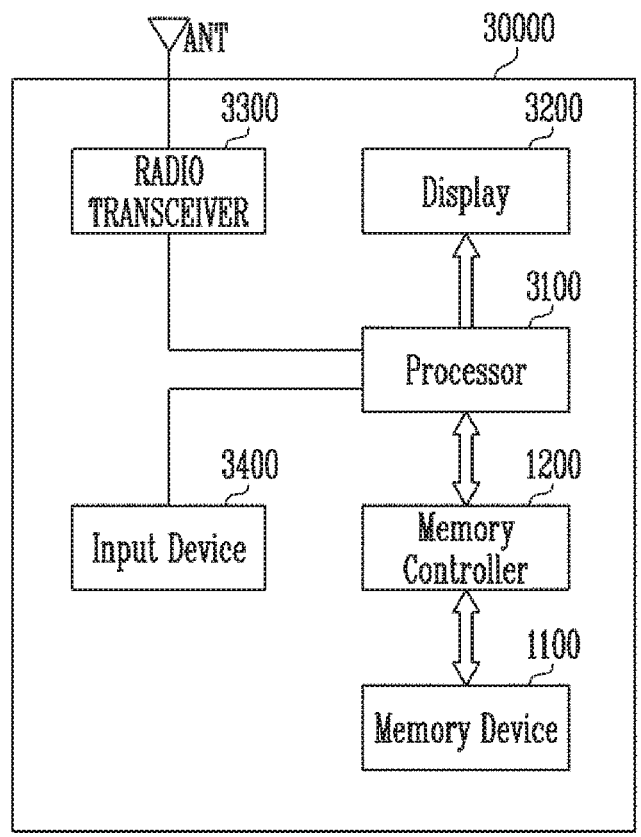
FIG. 20 is a diagram illustrating another embodiment of the memory system including the memory controller shown in FIG. 2.

FIG. 20 is a diagram illustrating another embodiment of the memory system including the memory controller shown in FIG. 2.

Referring to FIG. 20, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal receive through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the semiconductor memory device 1100. Also, the radio transceiver 3300 may convert a signal output from the processor 3100 into a radio signal, and output the converted radio signal to an external device through the antenna ANT. An input device 3400 capable of inputting a control signal for controlling an operation of the processor 3100 or data to be processed by the processor 3100 may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100.

Figure 21:
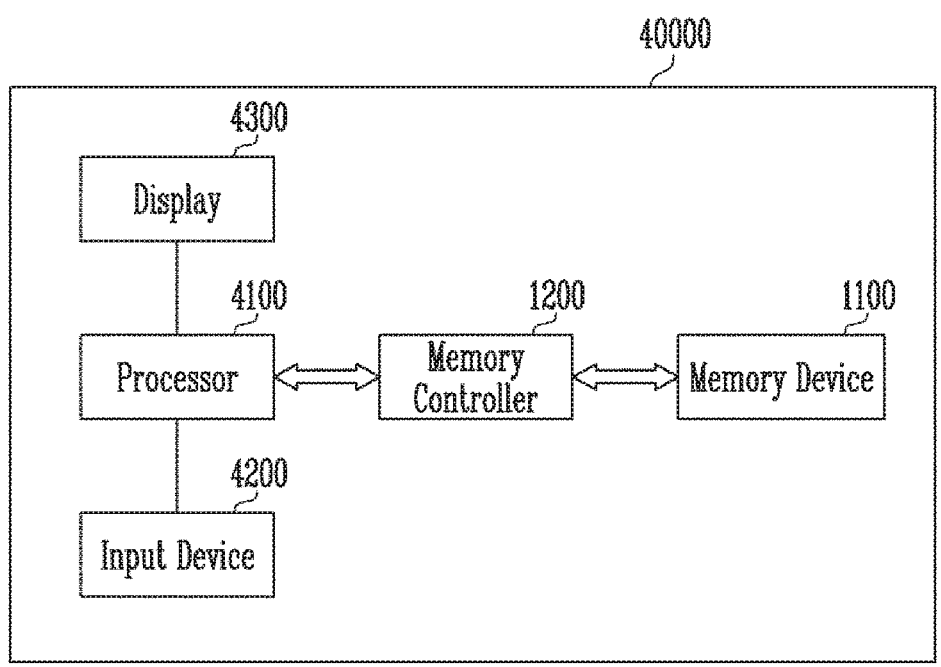
FIG. 21 is a diagram illustrating another embodiment of the memory system including the memory controller shown in FIG. 2.

FIG. 21 is a diagram illustrating another embodiment of the memory system including the memory controller shown in FIG. 2.

Referring to FIG. 21, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100.

Figure 22:
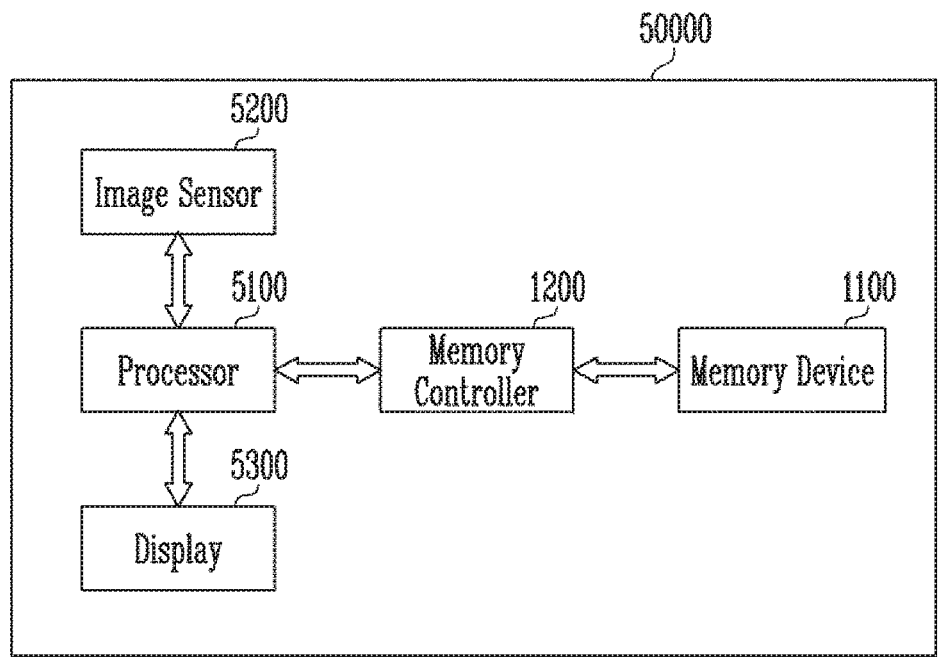
FIG. 22 is a diagram illustrating another embodiment of the memory system including the memory controller shown in FIG. 2.

FIG. 22 is a diagram illustrating another embodiment of the memory system including the memory controller shown in FIG. 2.

Referring to FIG. 22, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100.

Figure 23:
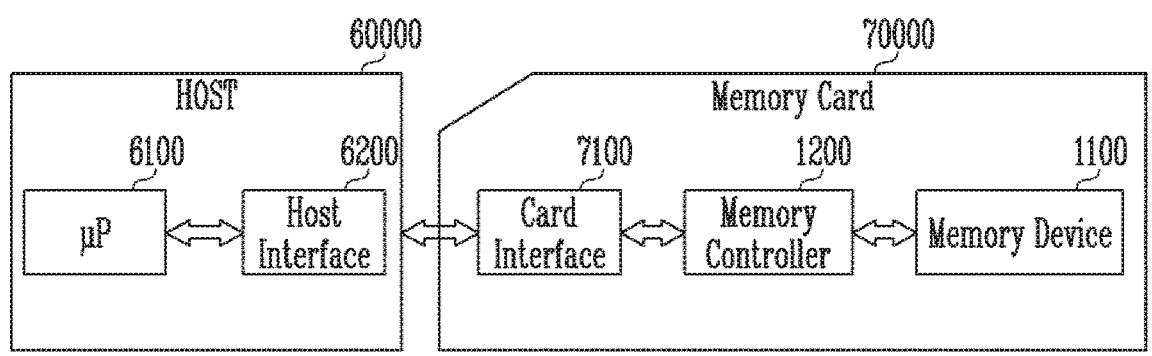
FIG. 23 is a diagram illustrating another embodiment of the memory system including the memory controller shown in FIG. 2.

FIG. 23 is a diagram illustrating another embodiment of the memory system including the memory controller shown in FIG. 2.

Referring to FIG. 23, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor (μP) 6100.

According to embodiments of the present disclosure, the last data in a cache read operation is managed according to a next command, so that the time required to perform a subsequent operation can be reduced.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
   a memory device including a page buffer for temporarily storing data read from a memory cell, the page buffer including first to third latches temporarily storing or transferring the data; and
   a memory controller coupled to the memory device through a channel,
   wherein the memory controller controls the memory device such that the first to third latches are selectively reset according to a previous operation performed in the memory device and a subsequent operation to be performed in the memory device,
   wherein the first latch coupled to the memory cell through a bit line stores data sensed from the memory cell, and the second latch transfers the data between the first and third latches and temporarily stores the data when the data of the memory cell is sensed in the first latch or the data in the third latch is outputted to the memory controller,
   wherein the first to third latches are reset when the subsequent operation is different from the previous operation, and
   wherein the first latch is kept or reset and the second and third latches are kept when the subsequent operation is the same as the previous operation.

2. The memory system of claim 1, wherein the memory controller includes:
   a command queue configured to queue a previous command corresponding to the previous operation and a subsequent command corresponding to the subsequent operation, and output command information including information of the previous command and the subsequent command;
   a command detector configured to determine whether the subsequent command is sequential to the previous command according to the command information, and selectively output a detection signal among detection signals in response to a result of the determination; and
   a command generator configured to generate the previous command and the subsequent command, and output a management command for selectively resetting the first to third latches in response to the detection signal.

3. The memory system of claim 2, wherein the command detector, according to the command information:
   outputs a first detection signal among the detection signals when it is determined that the subsequent command is for an operation different from that of the previous command;
   outputs a second detection signal among the detection signals when it is determined that the subsequent command is for a sequential operation similar to that of the previous command; and outputs a third detection signal among the detection signals when it is determined that the subsequent command is similar to the previous command but is not sequential.

4. The memory system of claim 3, wherein the command generator:
outputs a first management command in response to the first detection signal;
outputs a second management command in response to the second detection signal; and
outputs a third management command in response to the third detection signal.

5. The memory system of claim 4, wherein the command queue outputs a selected command among the first to third management commands as the management command and then outputs the subsequent command.

6. The memory system of claim 4, wherein the memory device includes:
a memory cell array including the memory cells;
the page buffer coupled to the memory cell array through bit lines, and temporarily storing the data read from the memory cell; and
a control logic controlling the page buffer in response to the commands or the management commands.

7. The memory system of claim 6, wherein the control logic controls the page buffer such that the first to third latches are all reset, when last data of the previous operation is output, in response to the first management command.

8. The memory system of claim 6, wherein the control logic controls the page buffer such that the subsequent operation is sequentially performed in response to the subsequent command without resetting the first to third latches, when last data of the previous operation is output, in response to the second management command.

9. The memory system of claim 6, wherein the control logic controls the page buffer such that the first latch is reset, when last data of the previous operation is output, in response to the third management command.

10. A memory system comprising:
a memory device including a memory cell storing data and first to third latches, wherein the first latch is coupled to the memory cell through a bit line, the second latch is coupled between the first and third latches, and the third latch outputs the data; and
a memory controller configured to control the memory device to simultaneously perform a data sensing operation and an output operation in response to a cache read command,
wherein the memory controller includes:
a command queue configured to queue the cache read command and output command information including information of a subsequent command of the cache read command;
a command detector configured to determine whether the subsequent command is sequential from the previous command according to the command information, and selectively output a detection signal among detection signals in response to a result of the determination; and
a command generator configured to generate a management command for selectively resetting the first to third latches in a memory device in response to the detection signal,
wherein the first latch stores the data sensed from the memory cell, and the second latch transfers the data between the first and third latches and temporarily stores the data when the data of the memory cell is sensed in the first latch or the data in the third latch is outputted to the memory controller,
wherein the first to third latches are reset when a subsequent operation is different from a previous operation, and
wherein the first latch is kept or reset and the second and third latches are kept when the subsequent operation is the same as the previous operation.

11. The memory system of claim 10, wherein the command queue:
queues and temporarily stores the cache read command; and
outputs the command information.

12. The memory system of claim 10, wherein the command detector, according to the command information:
outputs a first detection signal when it is determined that the subsequent command is for an operation different from that of the cache read command;
outputs a second detection signal when it is determined that the subsequent command is for a sequential operation similar to that of the cache read command; and
outputs a third detection signal when it is determined that the subsequent command is similar to the cache read command but is not sequential.

13. The memory system of claim 12, wherein the command generator:
outputs a first management command in response to the first detection signal;
outputs a second management command in response to the second detection signal; and
outputs a third management command in response to the third detection signal.

14. The memory system of claim 13, wherein the command queue outputs a selected command among the first to third management commands as the management command and then outputs the subsequent command.

* * * * *